3,432,594
COATINGS FOR RECTAL CAPSULES AND
PROCESS FOR THEIR MANUFACTURE
Kurt Bauer, Neu-Allschwil, Switzerland, assignor to Ciba
Corporation, New York, N.Y., a corporation of
Delaware
No Drawing. Filed Nov. 30, 1965, Ser. No. 510,692
Claims priority, application Switzerland, Dec. 31, 1964,
16,892/64
U.S. Cl. 424—33   5 Claims
Int. Cl. A61k 9/04

ABSTRACT OF THE DISCLOSURE

Coatings for rectal or vaginal capsules consisting of a nontacky, hydrophilic substance capable of forming gels with water, or of a mixture of such substances.

The present invention provides new coatings for rectal or vaginal capsules.

It is known that rectal capsules made from soft gelatin slide unsatisfactorily on insertion and, after having been moistened with water, stick both with body hairs and on overcoming the resistance of the rectal closure muscle. Nor was it possible to remedy these shortcomings satisfactorily by application of a cream or oil. It has also been proposed to provide the gelatin capsules with a coating consisting of one or several emulsifying or emulsifiable substances, preferably with a coating containing stearic acid or a derivative thereof or a higher fatty alcohol such as lauryl or octyl alcohol. In medical practice rectal capsules coated in this manner are still not quite satisfactory because owning to the fatty subtsances contained in the coating they have a fatty feel and because the coating melts, at least partially, at elevated temperatures such as are set up when the rectal capsules are sealed.

The present invention is based on the observation that the aforementioned disadvantages can be overcome by using a capsule coating that consists of a nontacky, hydrophilic substance capable of forming gels with water, or of a mixture of such substances. The new coatings are above all distinguished by their hard and smooth feel, when moistened with water or rectal liquid they slide very well and are not tacky, and they remain solid even at higher temperatures. In addition, by virtue of their considerable water binding property they protect the gelatin shell from any premature action of moisture.

As nontacky hydrophilic substances capable of forming gels with water there may be used organic or inorganic gel formers, such as hydroxyethyl cellulose, sodium carboxymethyl cellulose, pectines, aluminium-magnesium silicate, colloidal silica, especially methyl cellulose, or vegetable mucilages such as derivatives of aglinic acid, agar-agar, dextrins or acrylic acid polymers such as the polymers marketed under the trade names Carbopol 934, 940 or 941. These substances can be used by themselves, though it is preferable to use a mixture of two or more of them. Best results are obtained with a mixture of a cellulose derivative, especially hydroxyethyl cellulose, sodium carboxymethyl cellulose or above all methyl cellulose, with one of the said acrylic acid polymers, used at a ratio of about 10:1 to 1:10. Optimum results are achieved with a 1:1-mixture of methyl cellulose and an acrylic acid polymer.

The coating is applied to the filled rectal gelatin capsules in the usual manner, by dissolving the substances named in a solvent or mixture of solvents that does not cause the gelatin capsule to swell, such as a lower aliphatic alcohol, a lower aliphatic halogenated hydrocarbon, ester, e.g., ethyl acetate or an ether, e.g., diethyl ether, above all in a mixture of ethanol or methanol with chloroform or methylenechloride, then repeatedly moistening the capsules in a pill coating machine with small portions of the resulting solution and then allowing them to dry. If desired, the said solutions may further contain dyestuffs and other assistants.

The following examples illustrate the invention.

EXAMPLE 1

An intimate mixture of 50.0 g. of methyl cellulose and 50.0 g. of an acrylic acid polymer (registered trade name Carbopol 934) is suspended in 1500.0 g. of methylenechloride, and with continuous stirring 1500.0 g. of methanol are added until an almost clear solution has formed.

10 kg. of rectal capsules are evenly moistened in a pill coating machine with small portions of this solution and each portion is dried by injecting air. When 5 to 15 layers have been produced on the capsules, the latter are dried in a current of air heated at 60° C. The resulting capsules have a hard, smooth coating.

EXAMPLE 2

An intimate mixture of 30.0 g. of hydroxyethyl cellulose and 70.0 g. of an acrylic acid polymer (registered trade name Carbopol 940) is suspended in 1200.0 g. of chloroform. 1200.0 g. of methanol are then added while stirring continuously until an opalescent solution has formed.

Rectal capsules are coated with this solution as described in Example 1.

EXAMPLE 3

A mixture of 80.0 g. of acrylic acid polymer (registered trade name Carbopol 934), 15.0 g. of methyl cellulose and 15.0 g. of colloidal silica is suspended in 1 kg. of chloroform. While stirring continuously, 2 kg. of ethanol are then added until a slightly turbid solution has formed.

Rectal capsules are coated with this solution as described in Example 1.

EXAMPLE 4

A mixture of 50.0 g. of an acrylic acid polymer (registered trade name Carbopol 941), 30.0 g. of sodium carboxymethyl cellulose and 20.0 g. of pectine is suspended in 1 kg. of ethyl acetate. While stirring continuously, there are then added 2 kg. of ethanol, whereupon a slightly turbid solution forms.

Rectal capsules are coated with this solution as described in Example 1.

EXAMPLE 5

A mixture of 40.0 g. of finely comminuted magnesium-aluminium silicate (highly viscous; registered trade name Veegum) and 40.0 g. of water is allowed to swell overnight. 60.0 g. of methyl cellulose are suspended in 300.0 g. of trichloroethylene, while stirring continuously 1200.0 g. of ethanol are added until a slightly turbid solution has formed, and the magnesium-aluminium silicate gel is then added.

Rectal capsules are coated with this solution as described in Example 1.

I claim:

1. Filled and sealed soft gelatin rectal capsules having an external coating consisting of a nontacky, hydrophilic substance capable of forming a gel with water, or a mixture of such substances.

2. Filled and sealed soft gelatin rectal capsules having an external coating as claimed in claim 1, consisting of a hydrophilic substance selected from the group consisting an organic and an inorganic gel former, a vegetable mucilage, and an acrylic acid polymer.

3. Filled and sealed soft gelatin rectal capsules having an external coating as claimed in claim 1, consisting of a mixture of a cellulose derivative and an acrylic acid polymer.

4. Filled and sealed soft gelatin rectal capsules having an external coating as claimed in claim 3, consisting of a mixture of methyl cellulose and an acrylic acid polymer.

5. Filled and sealed soft gelatin rectal capsules having an external coating as claimed in claim 4, consisting of a 1:1-mixture of methyl cellulose and an acrylic acid polymer.

References Cited

UNITED STATES PATENTS

| 1,356,544 | 10/1920 | Miller | 167—64 |
| 1,366,941 | 2/1921 | Rhodehamel | 167—64 |
| 1,707,762 | 4/1929 | Homan | 167—64 |
| 2,020,107 | 11/1935 | Cruickshank | 128—271 |
| 2,467,884 | 4/1949 | Elias | 167—58 |
| 2,726,982 | 12/1955 | Ochs et al. | 167—58 |
| 2,777,796 | 1/1957 | Elias | 167—58 |
| 2,962,023 | 11/1960 | Chappaz et al. | 128—260 |
| 3,140,229 | 7/1964 | Schultz et al. | 167—64 XR |
| 3,197,369 | 7/1965 | Widman et al. | 167—64 |
| 3,234,091 | 2/1966 | Lang et al. | 167—64 |

LEWIS GOTTS, *Primary Examiner.*

S. K. ROSE, *Assistant Examiner.*

U.S. Cl. X.R.

424—35